United States Patent [19]

Jones et al.

[11] Patent Number: 5,851,406
[45] Date of Patent: Dec. 22, 1998

[54] PROCESS FOR PREVENTING THE DEGRADATION OF WATER SOLUBLE PACKAGING FILMS BY HALOGENATED HYDANTOINS OR CHLORINATED CYANURIC ACID AND APPARATUS FOR DISINFECTING A WATER SYSTEM

[75] Inventors: Ronald L. Jones, Suwanee; P. Kirk Mitchell, Marietta, both of Ga.

[73] Assignee: Bio-Lab, Inc., Decatur, Ga.

[21] Appl. No.: 561,934

[22] Filed: Nov. 22, 1995

Related U.S. Application Data

[63] Continuation of Ser. No. 319,979, Oct. 7, 1994, abandoned.

[51] Int. Cl.⁶ .................................. C02F 1/50; C02F 1/76
[52] U.S. Cl. ..................... 210/755; 210/198.1; 210/764; 252/175; 252/180; 252/181; 514/389; 514/390; 514/769; 514/770
[58] Field of Search ..................................... 210/749, 753, 210/754, 755, 756, 764, 198.1; 252/175, 180, 181; 514/389, 390, 769, 770

[56] References Cited

U.S. PATENT DOCUMENTS

| | | | |
|---|---|---|---|
| 4,119,535 | 10/1978 | White et al. | 210/755 |
| 4,372,868 | 2/1983 | Saran et al. . | |
| 4,498,921 | 2/1985 | Wojtowicz . | |
| 4,728,453 | 3/1988 | Choy . | |
| 5,004,549 | 4/1991 | Wood et al. | 210/756 |
| 5,205,955 | 4/1993 | Bunczk et al. . | |

*Primary Examiner*—Neil McCarthy
*Attorney, Agent, or Firm*—Woodard, Emhardt, Naughton Moriarty & McNett

[57] ABSTRACT

A method to prevent the degradation of water soluble film placed in contact with halogenated hydantoin or chlorinated cyanuric acid and an apparatus for disinfecting water systems. Halogenated 5,5-dialkyl hydantoin or chlorinated cyanuric acid is combined with a stabilizing agent to prevent the halogenated hydantoin or chlorinated cyanuric acid from discoloring or degrading a polymeric film which it may contact. The oxidizing agent includes alkaline hydroxide, alkaline carbonates, alkaline bicarbonates, alkaline phosphates, alkaline silicates, and alkaline borates. Polymeric films for which this is suitable include 2-hydroxy propyl cellulose and poly(vinyl alcohol).

38 Claims, No Drawings

PROCESS FOR PREVENTING THE DEGRADATION OF WATER SOLUBLE PACKAGING FILMS BY HALOGENATED HYDANTOINS OR CHLORINATED CYANURIC ACID AND APPARATUS FOR DISINFECTING A WATER SYSTEM

This application is a continuation of Ser. No. 08/319,979 filed on Oct. 7, 1994 which is now abandoned.

BACKGROUND OF THE INVENTION

This invention relates to a method and apparatus for cleaning and disinfecting water systems such as swimming pools, spas, decorative fountains, toilet tanks and recirculating water cooling systems with halogenated dialkylhydantoins or chlorinated cyanuric acid, and more particularly to a system where the active ingredients are supplied to the water in a shape-retentive or granular form surrounded by a water soluble film.

Typical hydantoins are 5,5-dimethylhydantoin, 5-ethyl-5-methylhydantoin, and 5,5-diethylhydantoin. Their particular substitution by an alkyl group in the 5-position is a function of the ketone used to synthesize the hydantoin by the Bucherer-Bergs reaction. Such hydantoins are easily substituted in the $N_1$ and the $N_3$ positions during halogenation. Halogenated hydantoins are well-known for their bleaching and disinfecting properties. Their effectiveness results from their ability to release halogen in aqueous solution. Examples of their use include: fabric bleaching, swimming pool disinfection, spa or hot tub disinfection, water cooling tower disinfection, automatic dishwasher-bleaching, and toilet bowl cleaners. Examples of these halogenated compounds include: 1,3-dibromo-5,5-dimethylhydantoin; 1-bromo-3-chloro-5,5-dimethylhydantoin and 1,3-dichloro-5,5-dimethylhydantoin.

Typical chlorinated cyanuric acids are sodium dichloroisocyanurate, sodium dichloroisocyanurate dihydrate, potassium dichloroisocyanurate, trichloroisocyanuric acid, and the mixed complex of 4 potassium dichloroisocyanurate to 1 trichloroisocyanuric acid. Similar to halogenated hydantoins, these compounds have also become standard ingredients in scouring powders, bleaches, sanitizers, cleansers, and swimming pool disinfectants.

In many applications, it is desirable to formulate the halogenated hydantoin or chlorinated cyanuric acid in a shape-retentive form, that is, as a stick, puck, tablet, or even granules to minimize handling problems of these potentially dusty and physically irritating compounds. However, these compounds are difficult to compact into solid forms of high integrity because they typically become brittle. A loss of integrity creates handling problems and increases the variance of dissolution rates among similar solid forms. In an effort to solve this problem, the prior art has placed a water soluble film around these shapes to contain any dust and help maintain shape integrity. However, halogenated hydantoins and chlorinated cyanuric acid routinely degrade water soluble polymeric films, evidenced by discoloration of the film before the materials are placed into water. What is needed is an improved delivery system for halogenated hydantoin which does not cause the degradation of a water soluble film in order that these compounds may retain their functionality to clean and disinfect water systems and maintain their aesthetic appeal to the consuming public. This invention addresses that need.

SUMMARY OF THE INVENTION

In accordance with one aspect of the present invention, a process is described for preventing the degradation of a water soluble polymer placed in contact with a halogenated hydantoin. The process includes halogenated 5,5-dialkylhydantoin to be combined with a stabilizing agent before contacting the film. Stabilizing agents used to practice this invention include: alkaline carbonates, alkaline hydroxides, alkaline bicarbonates, alkaline phosphates, alkaline silicates, and alkaline borates.

In accordance with another aspect of the present invention, an apparatus is described for disinfecting water systems. The apparatus includes a mixture of halogenated 5,5-dialkylhydantoin and at least one of the foresaid stabilizing agents. The agent is preferably present in an amount of no more than about 5% by weight of the combination. The mixture is preferably compacted into a solid form or granules, and then lastly, surrounded or enclosed in a water soluble polymer.

In accordance with yet another aspect of the present invention, a process is described for preventing the degradation of a water soluble polymer placed in contact with chlorinated cyanuric acid. The process includes chlorinated cyanuric acid to be combined with a stabilizing agent before contacting the film. Stabilizing agents used to practice this invention include: alkaline carbonates, alkaline hydroxides, alkaline bicarbonates, alkaline phosphates, alkaline silicates, and alkaline borates.

In accordance with still another aspect of the present invention, an apparatus is described for disinfecting water systems. The apparatus includes a mixture of chlorinated cyanuric acid and at least one of the foresaid stabilizing agents. The agent is preferably present in an amount of no more than about 5% by weight of the combination. The mixture is preferably compacted into a solid form or granules, and then lastly, surrounded or enclosed in a water soluble polymer.

An object of this invention is to provide a process and apparatus to disinfect a water system where a disinfecting compound is surrounded by a water soluble film and where the film does not degrade or discolor before use.

An advantage of this invention is that the shelf life of a packaged product is extended.

A feature of this invention is that the packaging remains aesthetically pleasing to the consuming public.

DESCRIPTION OF THE PREFERRED EMBODIMENTS

Specific language is used to describe several preferred embodiments of the present invention for the purpose of promoting an understanding of the principles of the invention. It should be understood that no limitation of the scope of the invention is intended by using this specific language. Any alteration or modification of the apparatus or method, or any application of the principles of the invention are contemplated if they would normally occur to one skilled in this art.

It has been discovered that halogenated hydantoins or chlorinated cyanuric acid can be prevented from attacking and degrading water soluble polymeric films by combining a small percentage of stabilizing agent with either group of compounds before they are placed in contact with the film. A film enclosing or surrounding this combination of materials does not generally discolor or otherwise show signs of degrading. The prevention of film degradation is important to prevent the film from being compromised and to maintain the aesthetic quality of the packaging surrounding the halogenated hydantoins or the chlorinated cyanuric acids.

Halogenated hydantoins are common oxidizing biocides used for water sanitization. Examples of them include:

1,3-dichloro-5,5-dimethylhydantoin (DCDMH), 1,3-dibromo-5,5-dimethylhydantoin (DBDMH), 1-bromo-3-chloro-5,5-dimethylhydantoin (BCDMH) and 1-bromo-3-chloro-5-methyl-5-ethylhydantoin (BCMEH). Halogenated hydantoins are typically supplied in solid forms such as tablets or granules and are delivered into the water system by allowing water to flow through the materials, often with the aid of an erosion feeder.

Halogenated hydantoins are prepared by simply halogenating a hydantoin. Most hydantoins are prepared by reacting ketones and aldehydes in the Bucherer-Bergs synthesis. This reaction is well-known and not within the scope of this invention; however for the convenience of the reader, the synthesis typically reacts the requisite aldehydes and ketones with potassium cyanide (2 moles) and ammonium carbonate (4 moles) in 50% aqueous alcohol at 60°–70° C. This preparation works with most aldehydes and ketones except some unsaturated, hydroxyl, or nitroaryl aldehydes. The necessary C-5 substituted hydantoins are obtained either through the condensation of aldehydes with hydantoin or directly through the Bucherer-Bergs synthesis with the necessary aldehydes and ketones. Examples of typical hydantoins are 5,5-dimethylhydantoin, 5-ethyl-5-methylhydantoin, and 5,5-diethylhydantoin. Many hydantoins are commercially available from laboratory supply houses, or in bulk from such sources in the United States as the Great Lakes Chemical Company, a notable supplier of 5,5-dimethylhydantoin.

The halogenation of hydantoins is also well-known in the art. Both of the nitrogen atoms in hydantoin in the N-1 and N-3 positions are readily halogenated. The actual halogenation is beyond the scope of this invention, however the following examples are offered for the convenience of the reader. 1,3-Dichloro-5,5-dimethylhydantoin, also known as dichlorohydantoin, is prepared in almost quantitative yield by passing chlorine through a 5% solution of 5,5-dimethylhydantoin in 6% aqueous sodium carbonate solution. 1,3-Dibromo-5,5-dimethylhydantoin is prepared by the addition of bromine to a solution of 5,5-dimethylhydantoin in 40% aqueous sodium carbonate solution at 30°–40° C. Dibromodimethylhydantoin is also commercially available in the United States from the Great Lakes Chemical Corporation under the tradename Brom-55, and is presently sold in Europe by ABM Industrial Products Ltd.

Typical commercially available chlorinated cyanuric acids include compounds such as sodium dichloroisocyanurate, sodium dichloroisocyanurate dihydrate, potassium dichloroisocyanurate, trichloroisocyanuric acid, and the mixed complex of 4 potassium dichloroisocyanurate to 1 trichloroisocyanuric acid. These compounds are used in formulations for bleaches, sanitizers, and swimming-pool disinfectants.

Chlorinated cyanuric acids are frequently formed by chlorinating cyanuric acid, collectively referring to both the trioxo and the trihydro tautomeric species. However, typically it is the trioxo species, or isocyanuric acid, that is chlorinated. The commercial production of isocyanuric acid involves the pyrolysis of urea. This reaction is well-known and not within the scope of this invention; however for the convenience of the reader, the synthesis typically requires solid urea to be heated up to 200°–300° C. for several hours. The isocyanuric acid (CA) is then produced according the following equation:

$$3\ H_2NCOHNH_2 \rightarrow CA + NH_3$$

During the pyrolysis, urea initially forms a free-flowing melt which subsequently thickens and finally solidifies. Components of the pyrolyzate include urea, biuret, possibly triuret, intermediates to isocyanuric acid, and aminotriazines which must be removed by acid digestion.

The chlorination of the isocyanuric acid involves the substitution of the hydrogen atoms attached to the nitrogens, and can be performed by many well-known and acceptable means. Again, though this reaction is well-known, an example follows for the convenience of the reader. Trichloroisocyanuric acid (TCCA) can be obtained in 90% yield by chlorination of a 3:1 mole ratio mixture of NaOH to isocyanuric acid (CA) in aqueous solution.

$$3\ NaOH + CA + 3\ Cl_2 \rightarrow TCCA + 3\ NaCl + 3\ H_2O$$

Alternatively, chlorine monoxide can also be used, $$2\ CA + 3\ Cl_2O \rightarrow 2\ TCCA + 3\ H_2O$$

Of the chlorinated isocyanuric acids, trichloro-s-triazine trione, also known as trichloroisocyanuric acid, is the most preferred to practice this invention. This compound is commercially available and shown below for the convenience of the reader.

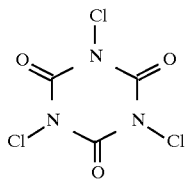

Trichloro-s-triazine Trione
(Trichloroisocyanuric acid)

In one fashion, the present invention is practiced by combining a stabilizing agent with one or more halogenated hydantoins before the halogenated hydantoins are placed in contact with a water soluble film. The addition of the stabilizing agent does not typically effect the performance of the halogenated hydantoins. Suitable stabilizing agents usable with this invention include: alkaline hydroxides, alkaline carbonates, alkaline bicarbonates, alkaline phosphates, alkaline silicates, and alkaline borates. A particular stabilizing agent can be used alone or with other stabilizing agents. The stabilizing agent is preferably combined with halogenated hydantoin up to a level of no more than about 5 weight % of the combination of stabilizing agent and halogenated hydantoin, and most preferably the stabilizing agent is present at a level in the range of about 0.5 weight % to about 3 weight %.

In another fashion, the present invention is practiced by combining a stabilizing agent with one or more chlorinated cyanuric acids, preferably trichloroisocyanuric acid, before the chlorinated cyanuric acid is placed in contact with a water soluble film. Suitable stabilizing agents include: alkaline hydroxides, alkaline carbonates, alkaline bicarbonates, alkaline phosphates, alkaline silicates, and alkaline borates. A particular stabilizing agent can be used alone or with other stabilizing agents. The stabilizing agent is preferably combined with chlorinated cyanuric acid up to a level of no more than about 5 weight % of the combination of stabilizing agent and chlorinated cyanuric acid, and most preferably the stabilizing agent is present at a level in the range of about 0.5 weight % to about 3 weight %.

As used within this specification, the term "alkaline" refers to metal cations within group IA and IIA referenced in the periodic table. In particular, this includes cations of the alkali metals lithium, sodium, potassium, rubidium, and cesium; and further includes cations of the alkaline earth metals beryllium, magnesium, calcium, strontium, barium, and radium.

The stabilizing agents can be combined with the halogenated hydantoin or chlorinated cyanuric acid in just about any conventional fashion known in this art. For example, the materials may be added through a batch or co-compaction operation. Examples of suitable equipment include a ribbon blender, an orbiting vertical screw, a simple tumbler or by recycled co-compaction such as with a FRITZ-MIL® compactor. The blended product is compressed into solid forms, such as sticks, pucks or tablets utilizing conventional equipment, and is then partially or completely wrapped with a water soluble film. The consumer then places the finished wrapped stick, puck or tablet directly into the water system that is to be treated, typically without ever physically contacting the combination of materials within the film. Due to the presence of the stabilizing agent, the water soluble film remains uncompromised by degradation and remains aesthetically pleasing until it is placed into service.

Water soluble films usable with this invention include those formed from water-soluble cellulose ethers. Cellulose ethers are typically prepared by the reaction of an organic halide with cellulose swollen by contact with an aqueous base:

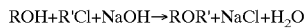

where ROH represents a cellulose residue and one of its hydroxyl groups, and R'Cl is the organic halide. R' can be methyl, ethyl, hydroxyethyl, hydroxypropyl, hydrobutyl, and sodium carboxymethyl, either as sole substituents or in combination with others. Chlorides are typically preferred over bromides or iodides, despite their lower reactivity, because of their higher diffusion rate in the heterogeneous reaction system used.

The most preferred water-soluble cellulose ether is 2-hydroxypropyl methyl cellulose. Other preferred water-soluble cellulose ethers include sodium carboxymethyl cellulose, sodium carboxymethyl 2-hydroxyethyl cellulose, 2-hydroxyethyl cellulose, methyl cellulose, 2-hydroxyethyl methyl cellulose, 2-hydrobutyl methyl cellulose, 2-hydroxyethyl ethyl cellulose, and 2-hydroxypropyl cellulose.

Other water soluble films usable with this invention include those formed from poly(vinyl alcohol). The manufacture of poly(vinyl alcohol) is well-known in the art and beyond the scope of this invention. However, for the convenience of the reader, a typical manufacturing scheme is described below.

One method to manufacture poly(vinyl alcohol) begins with the formation of vinyl acetate. Vinyl acetate is typically prepared from the oxidative addition of acetic acid to ethylene in the presence of a palladium catalyst:

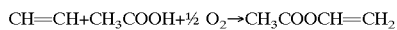

and can be carried out either in the liquid or in the vapor phase. In the liquid phase, typically a mixture of ethylene and oxygen at about 30 atm is fed into a single-stage reactor that contains acetic acid, water, and the catalyst at 100°–130° C. The vinyl acetate product is then separated using a series of distillation columns.

Vinyl acetate is then polymerized into poly(vinyl acetate):

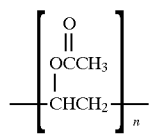

which is typically performed utilizing emulsion techniques. A typical emulsion recipe contains the vinyl acetate monomer, water, surfactant, initiator, buffer and, sometimes, a molecular weight regulator. This reaction is usually performed at atmospheric pressure.

Poly(vinyl alcohol) is prepared by converting poly(vinyl acetate) in base-catalyzed methanoloysis, with sodium hydroxide as the typical base:

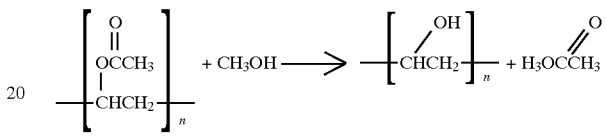

Poly(vinyl alcohol) is prepared in this fashion because it cannot typically be prepared by direct polymerization.

The formation of a film or other device used to contain the halogenated hydantoins is well within the skill of this art, and is not within the scope of this invention. However, for the convenience of the reader, typically a continuous tube is made by extruding the plastic through an annular die, and gas pressure is maintained within a particular range within the tube. In this fashion, a rather thin-walled, uniform-diameter tubing can be manufactured at a rapid rate. By properly controlling the air rate, it is possible to increase the tube diameter to a point where the tube is essentially a cylindrical film. This cylinder can be slit and laid flat, yielding a continuous film of excellent uniformity. In some film-blowing installations, the tube, after blowing and cooling, is nipped between a pair of rolls before being slit; this operation confines the air as a bubble between the extruder and the rolls, making continuous addition of gas unnecessary.

Calendaring is another process used for the continuous manufacture of film. Granular resin, or thick sheet, is passed between pairs of highly polished heated rolls under high pressure. A series of pairs is used with a gradual reduction in roll separation as the stock progresses through the unit. Proper calendaring requires precise control of roll temperature, pressure and speed of rotation.

The following Examples are provided to promote further understanding of the invention and its advantages. Thus, these examples are illustrative and not limiting in nature to the scope of the present invention described within this specification.

EXAMPLES

Example 1

The following is a laboratory procedure to evaluate compounds as to whether they prevent the degradation of water soluble films, such as 2-hydroxypropyl methyl or also known as methyl hydroxy propyl cellulose (MHPC), when blended with a halogenated hydantoin, such as 1-bromo-3-chloro-5,5-dimethylhydantoin (BCDMH).

Procedure

1) The required amounts of sanitizer (halogenated hydantoin) and test compound (stabilizer) so as to total 100 gm (see Table 1 for required amounts of sanitizer and test compound) are added to a 250 gm plastic bottle.

2) A lid is placed on the plastic bottle and the sanitizer and test compound are blended for 30 minutes in a small rotating blender.

3) Afterwards, the blended material is compressed into a 3" puck weighing 100 gms.

4) Each puck is then wrapped with a water soluble film.

5) The wrapped pucks are placed into a plastic bottle that is then sealed with a lid. The sealed bottle with wrapped puck is placed into an oven at 50° C. for seven days.

6) The bottles are removed from the oven and the film is observed for degradation.

TABLE 1

| SAMPLE | TEST COMPOUND | BCDMH |
|---|---|---|
| 14A | 0.1% sodium carbonate | 99.9% |
| 14B | 0.5% sodium carbonate | 99.5% |
| 14C | 1.0% sodium carbonate | 99.0% |
| 14D | 2.0% sodium carbonate | 98.0% |
| 14E | 3.0% sodium carbonate | 97.0% |

Results

Test samples 14A and 14B, which contained 0.1% and 0.5% sodium carbonate totally degraded the MHPC water soluble film. Test sample 14C which contained 1.0% sodium carbonate showed minimal attack on the MHPC film. Sample 14D and 14E, which contained 2.0% and 3.0% sodium carbonate did not attack the MHPC water soluble film.

Example 2

Sample pucks from Example 1 were sent to an independent lab for confirmation testing. These pucks were wrapped in the methyl-hydroxy-propyl cellulose film, placed into a plastic consumer package and then tested for film stability at ambient temperature, at 0° F., and at 125° F. for three days.
Results At ambient temperature, the sample puck 13A which contained 0.1% sodium carbonate degraded the film. Sample puck 13B which contained 0.5% sodium carbonate slightly degraded the film. Sample pucks 13C, 13D and 13E, which contained 1%, 2% and 3% sodium carbonate, did not degrade the film.

At 100° F. sample puck 13A degraded the film. Sample puck 13B slightly degraded the film. Sample pucks 13C, 13D and 13E did not degrade the film.

At 125° F. sample puck 13A degraded the film. Sample puck 13B and 13C slightly degraded the film. Sample pucks 13D and 13E did not degrade the film.

Example 3

The following is a laboratory procedure to evaluate compounds as to whether they will prevent the degradation of water soluble films, such as polyvinyl acetate and methyl-hydroxy-propyl cellulose when blended with a halogenated hydantoin, such as 1-bromo-3-chloro-5,5-dimethylhydantoin (BCDMH).

Procedure

1) The required amounts of sanitizer and test compound so as to provide the desired weight total (see Tables 2 and 3 for required amounts of sanitizer and test compound) are added to a 250 gm plastic bottle.

2) A lid is placed on the plastic bottle and the sanitizer and test compound are blended for 30 minutes in a small rotating blender.

3) Afterwards, the lid is removed and a small piece of water soluble film measuring approximately 2"×2" is placed on the top of the sample, and the lid is replaced.

4) The sample is placed into an oven at 50° C. for seven days.

5) Then the bottles are removed from the oven and the film is observed for degradation.

TABLE 2

| SAMPLE NO. | TEST COMPOUND | BCDMH |
|---|---|---|
| 1 | Borax 5 Mol (5 gm) | 95 gm |
| 2 | Soda Ash (5 gm) | 95 gm |
| 3 | Sodium Metasilicate Anhy (5 gm) | 95 gm |
| 4 | Sodium Bicarbonate Anhy (5 gm) | 95 gm |
| 5 | Sodium Bicarbonate Anhy (5 gm) | 95 gm |
| 6 | Potassium Phosphate Dibasic (5 gm) | 95 gm |
| 7 | Sodium Gluconate (5 gm) | 95 gm |
| 8 | Boric Acid (5 gm) | 95 gm |
| 9 | Sodium Chloride (5 gm) | 95 gm |
| 10 | — | 100 gm |
| 11 | — | — |
| 12 | Borax 5 Mol (5 gm) | — |
| 13 | Soda Ash (5 gm) | — |
| 14 | Sodium Metasilicate Anhy (5 gm) | — |
| 15 | Sodium Bicarbonate Anhy (5 gm) | — |
| 16 | Sodium Bicarbonate (5 gm) | — |
| 17 | Potassium Phosphate Dibasic (5 gm) | — |
| 18 | Sodium Gluconate (5 gm) | — |
| 19 | Boric Acid (5 gm) | — |
| 20 | Sodium Chloride (5 gm) | — |

Results

| SAMPLE NO. | (MHPC FILM) AFTER SEVEN DAYS | (PVA FILM) AFTER SEVEN DAYS |
|---|---|---|
| 1 | Moderate Degradation | |
| 2 | OK | |
| 3 | OK | |
| 4 | OK | |
| 5 | OK | |
| 6 | OK | |
| 7 | Degradation | |
| 8 | Degradation | |
| 9 | Degradation | |
| 10 | Moderate Degradation | |
| 11 | OK | |
| 12 | OK | |
| 13 | OK | |
| 14 | OK | |
| 15 | OK | |
| 16 | OK | |
| 17 | OK | |
| 18 | OK | |
| 19 | OK | |
| 20 | OK | |

TABLE 3

| SAMPLE NO. | TEST COMPOUND | PVA |
|---|---|---|
| 1 | Borax 5 Mol (5 gm) | 95 gm |
| 2 | Soda Ash (5 gm) | 95 gm |
| 3 | Sodium Metasilicate Anhy (3.75 gm) | 71.25 gm |
| 4 | Sodium Bicarbonate Anhy (5 gm) | 95 gm |
| 5 | Sodium Bicarbonate Anhy (3.75 gm) | 71.25 gm |
| 6 | Potassium Phosphate Dibasic (3.75 gm) | 71.25 gm |

TABLE 3-continued

| | | |
|---|---|---|
| 7 | Sodium Gluconate (3.75 gm) | 71.25 gm |
| 8 | Boric Acid (3.75 gm) | 71.25 gm |
| 9 | Sodium Chloride (3.75 gm) | 71.25 gm |
| 10 | — | 50 gm |
| 11 | — | 50 gm |
| 12 | Borax 5 Mol (5 gm) | 95 gm |
| 13 | Soda Ash (3.75 gm) | 71.25 gm |
| 14 | Sodium Metasilicate Anhy (3.75 gm) | 71.25 gm |
| 15 | Sodium Bicarbonate Anhy (3.75 gm) | 71.25 gm |
| 16 | Sodium Bicarbonate (3.75 gm) | 71.25 gm |
| 17 | Potassium Phosphate Dibasic (3.75 gm) | 71.25 gm |
| 18 | Sodium Gluconate (3.75 gm) | 71.25 gm |
| 19 | Boric Acid (3.75 gm) | 71.25 gm |
| 20 | Sodium Chloride (3.75 gm) | 71.25 gm |

Results

| SAMPLE NO. | PVA FILM AFTER SEVEN DAYS |
|---|---|
| 1 | Moderate |
| 2 | Moderate |
| 3 | Moderate |
| 4 | Slight |
| 5 | Slight |
| 6 | Slight |
| 7 | Extensive Degradation |
| 8 | Extensive Degradation |
| 9 | Extensive Degradation |
| 10 | Extensive Degradation |
| 11 | Extensive Degradation |
| 12 | Moderate |
| 13 | Moderate |
| 14 | Moderate |
| 15 | Slight |
| 16 | Slight |
| 17 | Slight |
| 18 | Extensive Degradation |
| 19 | Extensive Degradation |
| 20 | Extensive Degradation |

As demonstrated in the foregoing examples, the present invention provided noticeable stability improvements as compared to the prior art.

While the present invention is described in detail in this specification, these details are to be considered as illustrative and not restrictive in character. It should be understood that only the preferred embodiment is described and that all changes that come within the spirit of the present invention are desired to be protected.

What is claimed is:

1. A process for preventing the degradation of a water soluble polymer by halogenated hydantoins, comprising the steps of:
   (a) providing halogenated 5,5-dialkyl hydantoin;
   (b) providing a stabilizing agent, wherein said stabilizing agent is an alkaline carbonate, an alkaline hydroxide, an alkaline bicarbonate, an alkaline phosphate, an alkaline silicate, an alkaline borate, or mixtures of these compounds;
   (c) combining said halogenated hydantoin with said stabilizing agent to form a composition, said stabilizing agent present in an amount of at most about 5.0 weight % of said composition;
   (d) enclosing at least a portion of said composition in a water soluble polymer.

2. The process of claim 1, wherein said water soluble polymer is in the form of a film.

3. The process of claim 1, wherein said water soluble polymer includes methyl hydroxy propyl cellulose.

4. The process of claim 1, wherein said water soluble polymer includes polyvinyl alcohol.

5. The process of claim 1, wherein said stabilizing agent is present in an amount of from about 0.5 weight % to about 3.0 weight % of said composition.

6. The process of claim 1, further comprising the step of compressing said composition into a solid form.

7. The process of claim 6, wherein said solid form is a stick, puck, or tablet.

8. The process of claim 1, further comprising the step of granulating said composition.

9. The process of claim 1, wherein said halogenated 5,5-dialkyl hydantoin is selected from the group 1,3-dichloro-5,5-dimethylhydantoin, 1,3-dibromo-5,5-dimethylhydantoin, 1-bromo-3-chloro-5,5-dimethylhydantoin, and 1-bromo-3-chloro-5-methyl-5-ethylhydantoin.

10. An apparatus for disinfecting water systems, comprising:
   (a) a composition of halogenated 5,5-dialkylhydantoin and a stabilizing agent, said stabilizing agent selected from the group consisting of an alkaline carbonate, an alkaline hydroxide, an alkaline bicarbonate, an alkaline phosphate, an alkaline silicate, an alkaline borate, and mixtures of these compounds; said stabilizing agent being present in an amount of at most about 5.0 weight % of said composition; and
   (b) a water soluble polymer at least partially enclosing said composition.

11. The apparatus of claim 10, wherein said water soluble polymer is in the form of a film.

12. The apparatus of claim 10, wherein said polymer includes methyl hydroxy propyl cellulose.

13. The apparatus of claim 10, wherein said polymer includes polyvinyl alcohol.

14. The apparatus of claim 10, wherein said stabilizing agent is present in an amount of from about 0.5 weight % to about 3.0 weight % of said composition.

15. The apparatus of claim 10, wherein said composition is compressed into a solid form.

16. The apparatus of claim 15, wherein said solid form is a stick, puck, or tablet.

17. The apparatus of claim 10, wherein said composition is granulated.

18. The apparatus of claim 10, wherein said halogenated 5,5-dialkyl hydantoin is selected from the group 1,3-dichloro-5,5-dimethylhydantoin, 1,3-dibromo-5,5-dimethylhydantoin, 1-bromo-3-chloro-5,5-dimethylhydantoin, and 1-bromo-3-chloro-5-methyl-5-ethylhydantoin.

19. In a composition of halogenated 5,5-dialkyl hydantoin covered by a water soluble film, the improvement comprising combining with said halogenated 5,5-dialkyl hydantoin a stabilizing agent selected from the group consisting of an alkaline carbonate, an alkaline hydroxide, an alkaline bicarbonate, an alkaline phosphate, an alkaline silicate, an alkaline borate, and mixtures of these compounds, said stabilizing agent being present in an amount of at most about 5.0 weight % of said composition.

20. A process for preventing the degradation of a water soluble polymer by chlorinated cyanuric acid, comprising the steps of:
   (a) providing chlorinated cyanuric acid;
   (b) providing a stabilizing agent, wherein said stabilizing agent is an alkaline carbonate, an alkaline hydroxide, an alkaline bicarbonate, an alkaline phosphate, an alkaline silicate, an alkaline borate, or mixtures of these compounds;

(c) combining said chlorinated cyanuric acid with said stabilizing agent to form a composition, said stabilizing agent present in an amount of at most about 5.0 weight % of said composition;

(d) enclosing at least a portion of said composition in a water soluble polymer.

21. The process of claim 20, wherein said water soluble polymer is in the form of a film.

22. The process of claim 20, wherein said water soluble polymer includes methyl hydroxy propyl cellulose.

23. The process of claim 20, wherein said water soluble polymer includes polyvinyl alcohol.

24. The process of claim 20, wherein said stabilizing agent is present in an amount of from about 0.5 weight % to about 3.0 weight % of said composition.

25. The process of claim 20, further comprising the step of compressing said composition into a solid form.

26. The process of claim 20, further comprising the step of granulating said composition.

27. The process of claim 20, wherein said chlorinated cyanuric acid is selected from the group sodium dichloroisocyanurate, sodium dichloroisocyanurate dihydrate, potassium dichloroisocyanurate, trichloroisocyanuric acid, and a complex of potassium dichloroisocyanurate and trichloroisocyanuric acid.

28. The process of claim 20, wherein said chlorinated cyanuric acid is trichloroisocyanuric acid.

29. An apparatus for disinfecting water systems, comprising:

(a) a composition of chlorinated cyanuric acid and a stabilizing agent, said stabilizing agent selected from the group consisting of an alkaline carbonate, an alkaline hydroxide, an alkaline bicarbonate, an alkaline phosphate, an alkaline silicate, an alkaline borate, and mixtures of these compounds; said stabilizing agent being present in an amount of at most about 5.0 weight % of said composition; and (b) a water soluble polymer at least partially enclosing said composition.

30. The apparatus of claim 29, wherein said water soluble polymer is in the form of a film.

31. The apparatus of claim 29, wherein said polymer includes methyl hydroxy propyl cellulose.

32. The apparatus of claim 29, wherein said polymer includes polyvinyl alcohol.

33. The apparatus of claim 29, wherein said stabilizing agent is present in an amount of from about 0.5 weight % to about 3.0 weight % of said composition.

34. The apparatus of claim 29, wherein said composition is compressed into a solid form.

35. The apparatus of claim 34, wherein said solid form is a stick, puck, or tablet.

36. The apparatus of claim 29, wherein said composition is granulated.

37. The apparatus of claim 30, wherein said chlorinated cyanuric acid is selected from the group sodium dichloroisocyanurate, sodium dichloroisocyanurate dihydrate, potassium dichloroisocyanurate, trichloroisocyanuric acid, and a complex of potassium dichloroisocyanurate and trichloroisocyanuric acid.

38. The apparatus of claim 29, wherein said chlorinated cyanuric acid is trichloroisocyanuric acid.

* * * * *